April 15, 1952     W. L. SCHRADER     2,593,060
LOAD POINTER FOR WEIGHING SCALES
Filed July 20, 1948
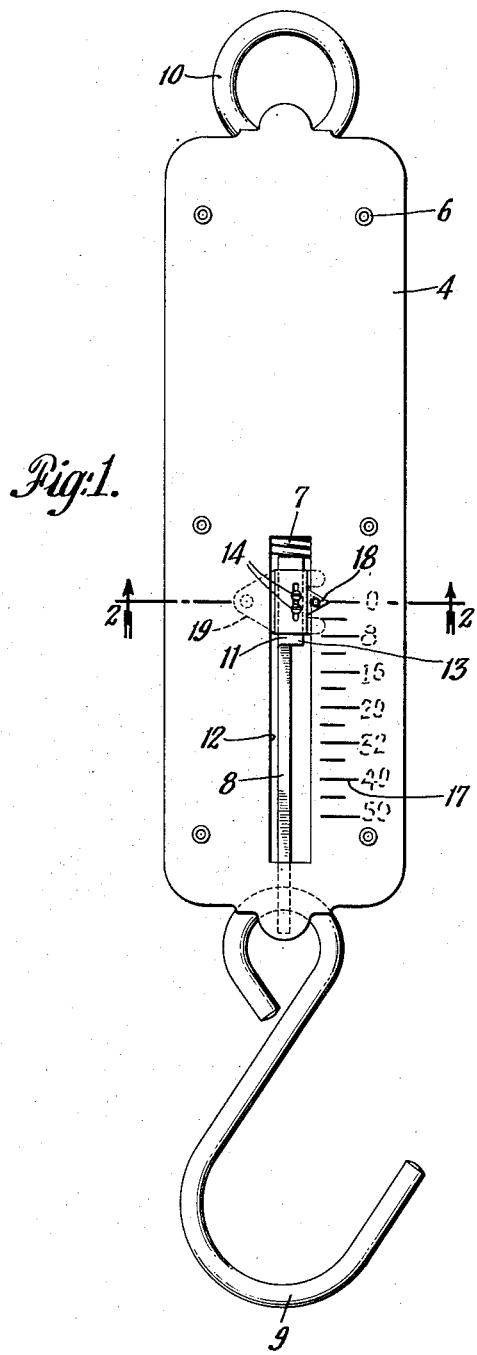
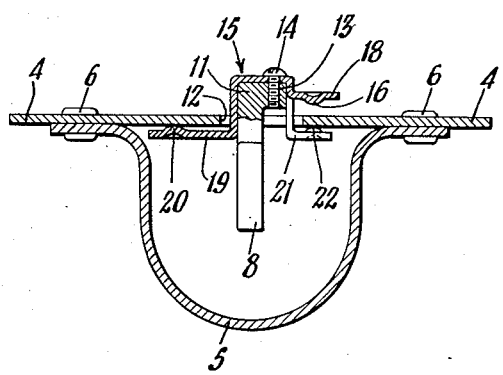
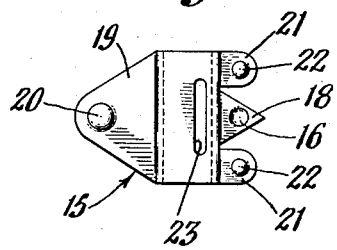
INVENTOR
WILLIAM L. SCHRADER
BY
Donald W. Robertson
ATTORNEY Patented Apr. 15, 1952

2,593,060

UNITED STATES PATENT OFFICE 2,593,060

LOAD POINTER FOR WEIGHING SCALES

William L. Schrader, Philadelphia, Pa., assignor to John Chatillon & Sons, New York, N. Y., a corporation of New York Application July 20, 1948, Serial No. 39,703

4 Claims. (Cl. 116—124)

The invention relates to weighing scales, and more particularly to load pointers for such scales.

In the most common form of straight spring scale as manufactured heretofore, the load pointer is formed as an integral part of the runner member, this being the member which at its upper end is attached to the spring, and from the lower end of which the load or load carrier (hook or tray) is hung. The portion of the runner which carries the load pointer extends through a vertical slot in the front of the scale and parallel with the graduations on its face. With this construction, the tensioning of the spring under load produces a certain amount of twist and this tends to disturb the alignment between the pointer and the scale graduations, decreasing the accuracy of the reading due to parallax and causing the sharp end of the pointer to scratch or gouge the face of the scale after it has been used for a time.

It is a leading object of my invention to provide a load pointer construction which will overcome these difficulties, preserving more accurate alignment between the pointer and the face of the scale, reducing parallax and friction, and preventing marring of the graduations.

A further object is to provide a load pointer which is adjustable with respect to its point of attachment to that portion of the runner which projects through the slot in the face of the scale, and which includes means for maintaining the adjustment by protecting the load pointer against disturbance through overloading of the scale or sudden load release.

Other objects and advantages will appear as the description proceeds.

In the drawings, Fig. 1 is a face view of a straight spring scale embodying my invention in its preferred form.

Fig. 2 is a detail cross-sectional view taken as indicated at 2—2 in Fig. 1, and Fig. 3 is a detail view of the load pointer.

In its general arrangement my invention comprises in combination with a weighing scale having a slotted face and a runner with a portion slidably arranged in the slot of the scale face, a loaded pointer fixed to the runner portion, the pointer having a projection for sliding contact with the face of the scale, and an arm or arms offset from the pointer proper and extending underneath the face of the scale for guiding a contact therewith. As applied to the straight spring scale illustrated, the scale combination includes a front member or face 4 and a back casing member 5 secured thereto as by means of the rivets 6, and a conventional coil spring 7 from which is suspended runner 8. Suitable load carrying means are provided, such as the hook 9 attached to the lower end of the runner. A ring 10 or other means may be provided at the upper end of the scale as is usual in this type of scale.

Runner 8 has a forwardly extending projection 11 which extends through slot 12 in the face of the scale and is slidably arranged in this slot. At its forward end, projection 11 has a laterally extending flange 13 which in my preferred construction is drilled and tapped for machine screws 14 for adjustable attachment of the load pointer 15.

Load pointer 15 has a projecting portion such as the rounded protuberance 16 for occasional contact with the face of the scale adjacent its graduations 17 to positively limit movement of the sharp end 18 of the pointer toward the face of the scale. Also it has an arm 19 which is inwardly offset from the pointer proper and arranged to extend underneath the face of the scale. This arm has a projecting portion, preferably in the form of a rounded protuberance 20, for occasional guiding contact with the under face of the scale. In my preferred construction illustrated there are also a pair of arms 21, 21 inwardly offset from the pointer proper and extending under the face of the scale for guiding contact therewith, these arms being opposed to arm 19 so as to provide guides at the under face of the scale on both sides of the slot 12 therein. Arms 21 may have projections in the form of rounded protuberances 22, although it will be understood that these projections, and projections 16 and 20 previously mentioned, need not be of the particular form shown. Load pointer 15 and offset arms 21 are freely movable toward and away from the face of the scale to the extent permitted by the clearance between them.

The offset arms 19 and 21 may conveniently be formed as flanged extensions of the inverted U-shaped body portion of the load pointer. The base of the U is slotted as at 23 to permit longitudinal adjustment of the pointer which is clamped to the runner by means of the screws 14. After the manufacture of the scale has been completed, screws 14 can be loosened and the pointer 15 adjusted to its correct zero setting, after which the screws are tightened. It should be observed that the projection 11 of the runner is somewhat longer than the body portion of the load pointer and that when the pointer is adjusted to its extreme limiting positions, projection 11 will still extend slightly beyond the upper or lower end of the body portion of the pointer as the case may be. Thus, should the scale be overloaded, the lower end of projection 11 of the runner will come into contact with the lower end of slot 12 in the face of the scale, absorbing the shock of overloading without disturbing the adjustment of the load pointer, because the latter does not come into contact with the end of the slot 12. Similarly, upon sudden load release, the upper end of projection 11 will come in contact with the upper end of slot 12 so as to protect the load pointer against disturbance and maintain its correct adjustment.

Projection 16 contacts only that portion of the face of the scale which lies between the graduations and the edge of slot 12 so that there is little possibility of marring the graduations, and marring of the graduations through scratching by the sharp end 18 of the pointer is prevented altogether by the predetermined spacing achieved through use of the projection 16 alone or in combination with projections 20 and 22 of the offset arms 19 and 21.

I have found that pointers of the construction described are effective in controlling the twist of the springs when they are placed in tension, and in reducing friction between the face of the scale and the runner, thus helping to insure greater accuracy in reading. The reduction of parallax secured also contributes to accuracy in reading.

The pointer may be formed as a stamping from a flat metal sheet, or if desired it can be made in other ways and from other materials.

The terms and expressions which I have employed are used in a descriptive and not a limiting sense, and I have no intention of excluding such equivalents of the invention described, or of portions thereof, as fall within the purview of the claims.

I claim:

1. In a weighing scale, a load pointer having an inwardly projecting portion for occasional contact with the face of the scale adjacent the graduations thereof to positively limit movement of the pointer toward the face of the scale, and having an arm offset from pointer proper constructed and arranged to extend underneath the face of the scale, said arm having a projecting portion for occasional contact with the under face of the scale.

2. In combination with a weighing scale having a slotted face and a runner with a portion slidably arranged in the slot of the scale face, a load pointer fixed to said runner portion, the pointer having an inward projection for spacing the pointer from the face of the scale and arms offset from the pointer proper and extending underneath the face of the scale for occasional guiding contact therewith, said pointer and offset arms being freely movable toward and away from the face of the scale to the extent permitted by the clearance between them.

3. In combination with a weighing scale having a slotted face and a runner with a portion slidably arranged in the slot of the scale face, a load pointer fixed to said runner portion, the pointer having an inward projection for occasional contact with the face of the scale to positively limit movement of the pointer toward the face of the scale, and arms offset from the pointer proper and extending underneath the face of the scale at each side of the slot therein for occasional contact therewith, said pointer and offset arms being freely movable toward and away from the face of the scale to the extent permitted by the clearance between them.

4. In combination with a weighing scale having a slotted face and a runner with a portion slidably arranged in the slot of the scale face, a load pointer fixed to said runner portion, the pointer having an inwardly directed projection for occasional contact with the face of the scale and arms offset from the pointer proper and extending underneath the face of the scale for occasional guiding contact therewith, said arms having projections opposed to the aforesaid pointer projection, said pointer and offset arms being freely movable toward and away from the face of the scale to the extent permitted by the clearance between them.

WILLIAM L. SCHRADER.

REFERENCES CITED

The following references are of record in the file of this patent:

UNITED STATES PATENTS

| Number | Name | Date |
|---|---|---|
| 28,838 | Crowell | June 26, 1860 |
| 629,290 | Goodbaudy | July 18, 1899 |
| 2,148,806 | Da Voll | Feb. 28, 1939 |

FOREIGN PATENTS

| Number | Country | Date |
|---|---|---|
| 2,186 | Great Britain | Sept. 4, 1863 |